United States Patent
Register, III (10) Patent No.: US 8,428,407 B2
(45) Date of Patent: Apr. 23, 2013

(54) FIBER OPTIC JUMPER CABLE WITH BEND-RESISTANT MULTIMODE FIBER

(75) Inventor: James A. Register, III, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 476 days.

(21) Appl. No.: 12/603,131

(22) Filed: Oct. 21, 2009

(65) Prior Publication Data

US 2011/0091173 A1   Apr. 21, 2011

(51) Int. Cl.
G02B 6/44   (2006.01)

(52) U.S. Cl.
USPC ............... 385/113; 385/100; 264/1.25

(58) Field of Classification Search .......... 385/100, 385/104–113; 264/1.24–1.25
See application file for complete search history.

(56) References Cited

U.S. PATENT DOCUMENTS

| | | | |
|---|---|---|---|
| 7,187,829 B2 * | 3/2007 | Anderson et al. | 385/100 |
| 7,397,991 B1 | 7/2008 | Register | 385/102 |
| 7,668,427 B2 | 2/2010 | Register | 385/102 |
| 7,796,853 B2 * | 9/2010 | Abernathy et al. | 385/100 |
| 7,995,885 B2 | 8/2011 | Register | 385/102 |
| 2008/0008430 A1 * | 1/2008 | Kewitsch | 385/113 |
| 2009/0169163 A1 * | 7/2009 | Abbott et al. | 385/127 |
| 2009/0263089 A1 * | 10/2009 | Keller et al. | 385/109 |
| 2010/0322572 A1 * | 12/2010 | Sakabe et al. | 385/100 |
| 2011/0075979 A1 * | 3/2011 | Ma et al. | 385/107 |
| 2011/0110634 A1 * | 5/2011 | Hurley | 385/102 |

\* cited by examiner

Primary Examiner — Ellen Kim
(74) Attorney, Agent, or Firm — Russell Scott Magaziner (57) ABSTRACT

A fiber optic jumper cable having a central axis includes a bend-resistant multimode optical fiber generally arranged along the central axis. A tensile-strength layer surrounds the bend-resistant optical fiber. A protective cover surrounds the tensile-strength layer and has an outside diameter $D_O$ in the range 1.6 mm$\leq D_O \leq$4 mm.

8 Claims, 7 Drawing Sheets

FIBER OPTIC JUMPER CABLE WITH BEND-RESISTANT MULTIMODE FIBER

BACKGROUND

1. Technical Field

The present disclosure relates generally to fiber optic cables, and in particular relates to a fiber optic jumper cable having a bend-resistant multimode optical fiber.

2. Technical Background

Conventional fiber optic cables include optical fibers that conduct light for transmitting voice, video and/or data. The construction of fiber optic cables should preserve optical performance when deployed in the intended environment while also meeting the other additional requirements for the environment. Mechanical requirements or characteristics, such as crush performance, permissible bend radii, temperature performance, and the like, are preferred to inhibit undesirable optical attenuation or impaired performance during installation and/or operation within the space in which the fiber optic cable is deployed.

Fiber optic cables that connect optical devices over relatively short distances (e.g., up to a few meters) are referred to in the art as "patch cords" or "jumper cables," or just "jumpers" for short. Jumpers are often used to form cross-connections between terminated optical fibers. For example, jumpers are used to connects ports within a fiber distribution frame (FDF), which is a telecommunications device in the form of a large panel having interconnected fiber terminations at corresponding ports.

Because jumpers are relatively short, they typically employ multimode optical fibers. Certain types of jumpers are intended for outdoor use, such as in network access points (NAPs) and network interface units (NIUs). Because space is limited in FDFs, NAPs, NIUs and like telecommunication devices, it is preferred that the jumpers not only be flexible, but have the ability to be sharply bent so that the amount of space they occupy is as small as possible. Unfortunately, most jumpers cannot tolerate significant bending because the light traveling therein will be attenuated beyond allowable limits. In fact, many types of jumpers have strength elements embedded therein to prevent the jumper from bending beyond a select bending radius. This reduces the ability of the jumper to fit within a tight space, thereby requiring the telecommunication device in which the jumper is used to be sized to accommodate the relatively bend-sensitive jumper.

SUMMARY

An aspect of the disclosure is a fiber optic jumper cable having a central axis. The cable includes a bend-resistant multimode optical fiber generally arranged along the central axis, and a tensile-strength layer surrounding the bend-resistant optical fiber. A protective cover surrounds the tensile-strength layer and has an outside diameter $D_O$ in the range $1.6$ mm$\leq D_O \leq 4$ mm.

Another aspect of the disclosure is a fiber optic jumper cable that includes a bend-resistant multimode optical fiber generally axially arranged along the cable central axis and having a nominal outside diameter of 900 microns, and a core having a nominal diameter of 50 microns. The cable includes a tensile strength layer immediately surrounding the bend-resistant optical fiber. A protective cover immediately surrounds the tensile strength layer and has an outside diameter $D_O$ in the range $1.6$ mm$\leq D_O \leq 4$ mm.

Another aspect of the disclosure is a method of forming a fiber optic jumper cable having a central axis. The method includes disposing a bend-resistant multimode optical fiber generally along the central axis, and surrounding the bend-resistant optical fiber with a tensile-strength layer. The method also includes surrounding the tensile-strength layer with a protective cover having an outside diameter $D_O$ in the range $1.6$ mm$\leq D_O \leq 4$ mm.

It is to be understood that both the foregoing general description and the following detailed description present embodiments of the disclosure, and are intended to provide an overview or framework for understanding the nature and character of the disclosure as it is claimed. The accompanying drawings are included to provide further understanding of the disclosure, and are incorporated into and constitute a part of this specification. The drawings illustrate the various example embodiments of the disclosure and, together with the description, serve to explain the principles and operations of the disclosure.

DETAILED DESCRIPTION

Reference is now made in detail to the present preferred embodiments of the disclosure, examples of which are illustrated in the accompanying drawings. Whenever possible, identical or similar reference numerals or symbols are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

In the discussion below, the terms "fiber optic jumper cable" and "cable" refer to an unconnectorized cable, while the term "jumper" refers to a connectorized cable, i.e., a cable having at least one connector.

Figure 1:
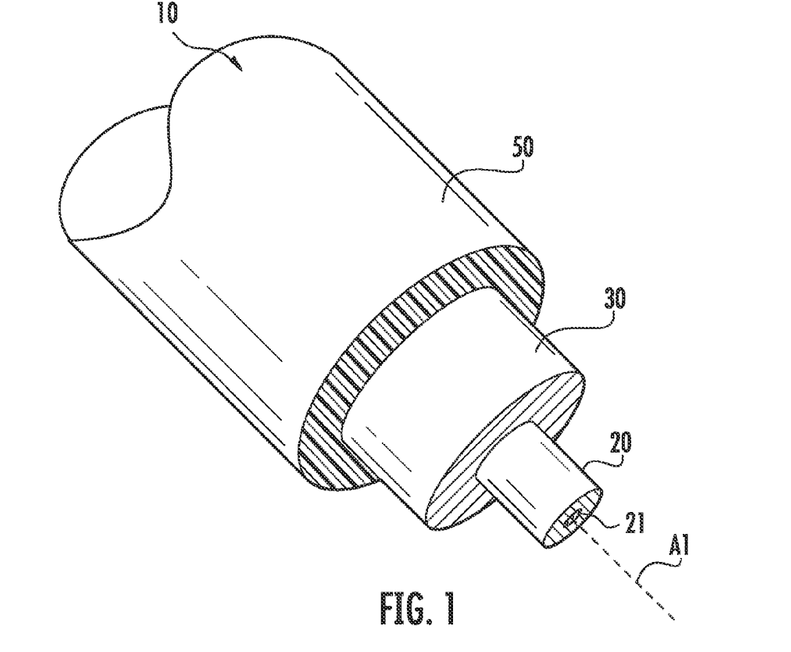
FIG. 1 is fragmentary isometric view and FIG. 2 is a cross-sectional view of an example fiber optic jumper cable according to one example embodiment.
Figure 2:
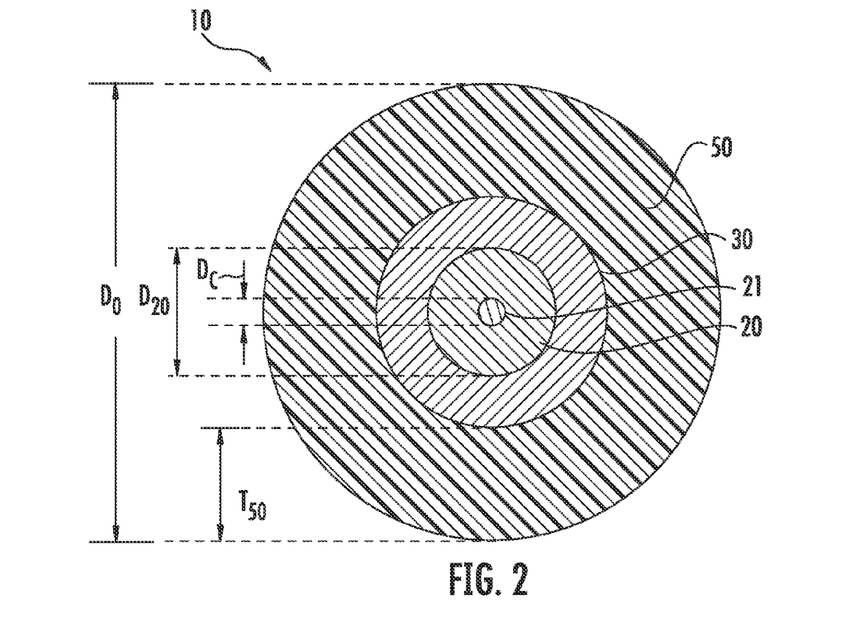

FIG. 1 is a fragmentary isometric view and FIG. 2 is a cross-sectional view of a fiber optic jumper cable ("cable") 10 according to one embodiment. Cable 10 can have other configurations, although the cable of FIG. 1 and FIG. 2 is described in more detail hereinbelow for purposes of illustration. Cable 10 is suitable, for example, for forming a jumper used in telecommunication devices such as FDFs, and in particular is useful for outdoor telecommunication devices such NAPs, NIUs and like outdoor units of a telecommunications system or network.

Cable 10 has a central axis A1 and includes a bend-resistant multimode optical fiber ("BR-MM fiber") 20 arranged generally along the central axis. An example BR-MM fiber 20 has a nominal outside diameter $D_{20}=900$ microns and has a core 21 with a nominal diameter $D_C=50$ microns. Example BR-MM fibers 20 are described in greater detail below.

Cable 10 also includes a tensile-strength layer 30 that surrounds BR-MM fiber 20. In an example embodiment, tensile-strength layer 30 immediately surrounds BR-MM fibers 20, as shown. In an example embodiment, tensile-strength layer 30 comprises at least one of water-blocked stranded aramid yarn, super-absorbing polymer (SAP), SAP-coated filaments, fiberglass, and like elements used in cables to achieve water blocking and/or tensile-strength enhancement. Tensile-strength layer 30 also serves as a cushioning layer that protects BR-MM fiber 20.

Cable 10 also includes a protective outer layer in the form of a cable jacket 50 that surrounds tensile-strength layer 30. In an example embodiment, cable jacket 50 immediately surrounds tensile-strength layer 30, without any intervening layers or elements. Cable jacket 50 can be formed of various materials, but in example embodiments is formed from a thermoplastic elastomer such as polyethylene (PE). Plastics such as polyvinyl chloride (PVC) may be used, but such plastics tend to degrade with age and exposure to the elements so that their use for outdoor applications is not typically preferred. Cable jacket 50 may be formed of other types of plastics, including flame retardant polyethylene (FRPE), fluoro-plastics, such as PVDF, fluoro-compounds as disclosed by U.S. Pat. No. 4,963,609, and blends of PVC and PVDF or PVC and PE. Cable jacket 50 may also be formed from combinations of the above-identified materials.

While polyurethane is a very good material for cable jacket 50 in terms of resistance to cold temperatures, ruggedness and shrinkage, it is also presently about $10/kg and thus about ten times more expensive than PE. Thus, embodiments of the invention include a cable jacket 50 comprising PE and a cable jacket 50 that consists solely of PE. When the cable jacket 50 is said to comprise polyethylene, it is understood that other compositions may be present in the cable jacket in smaller amounts than polyethylene. For the purposes of this specification, a "polyethylene jacket" is formed of at least 80% polyethylene.

In an example embodiment, cable jacket 50 is designed to have increased burn resistance such that the fiber optic cable has a riser, a plenum and/or a low smoke zero halogen rating. In this regard, cable jacket 50 can include aluminum trihydrate, antimony trioxide or other additives that increase the burn resistance of the cable jacket as known to those skilled in the art, and as described by U.S. Pat. No. 6,167,178. Additionally, cable jacket 50 can be designed to be resistant to UV light, which is desirable for outdoor applications.

Three example sizes of cable 10 include an outside $D_0=1.65$ mm with cable jacket thickness $T_{50}=0.18$ mm; an outside $D_0=2$ mm with cable jacket thickness $T_{50}=0.25$ mm; and an outside $D_0=3$ mm with cable jacket thickness $T_{50}=0.5$ mm. An example thickness $T_{50}$ for cable jacket 50 is in the range $0.15\text{ mm} \leq T_{50} \leq 0.55\text{ mm}$, with $T_{50}=0.25$ min being an exemplary thickness. An example cable 10 has an outside diameter $D_0$ in the range $1.6\text{ mm} \leq D_0 \leq 4\text{ mm}$, with $D_0=2.0$ mm (nominal) being an exemplary outside diameter suitable for many applications.

Fiber optic cables for outdoor use have traditionally used polyethylene for the cable jacket since it is moderate in cost but performs reasonably well in harsh environments where the cable is exposed to cold temperatures, ultraviolet (UV) exposure, abrasion and impacting forces. However, because PE generally undergoes significant amounts of shrinkage due to aging and exposure to cold temperatures, conventional cables with PE jackets included one or more anti-buckling strength elements. Anti-buckling elements were used because buckling or bending leads to bending of the optical fiber within the cable, which in turn causes attenuation of light traveling in the optical fiber. An example anti-buckling strength element for a conventional jumper is rigid, such as a glass-reinforced plastic (GRP) rod. Typical GRP rods have a diameter between 1.25 mm to 2.05 mm, and add to the cost and complexity of manufacture, as well as increasing the bend radius of the cable. The cable embodiments according to the present embodiments are constructed such that PE jacketing materials are used without the requirement of anti-buckling elements. For example, the cables can be free of GRP rods and other anti-buckling elements. This allows the fiber or fibers in the cables to be generally aligned with the cable centerline. As its name implies, tensile-strength layer 30 only provides protection from tensioning forces and does not provide substantial anti-buckling (including anti-bending) strength.

Figure 3:
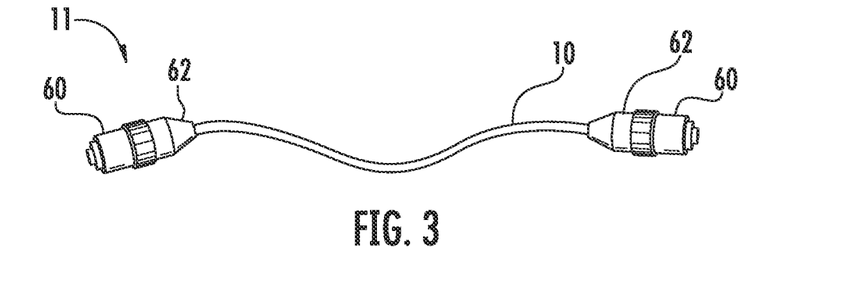
FIG. 3 is a side view of an example jumper comprising the jumper fiber optic jumper cable of FIG. 1 but with connectorized ends.

FIG. 3 is a side view of an example embodiment of a connectorized cable 10, i.e., a jumper 11 having connectors 60 at each end. Example types of connectors 60 include SC, FC, LC and ST connectors. FIG. 3 shows two FC-type connectors 60 by way of example. In an example embodiment, connector 60 simply comprises a ferrule. In an example embodiment, connectors 60 include respective strain-relief boots 62 that allow cable 10 to have a substantial bend at the base of each connector. In an example embodiment, jumper 11 is connectorized only at one end.

Figure 4:
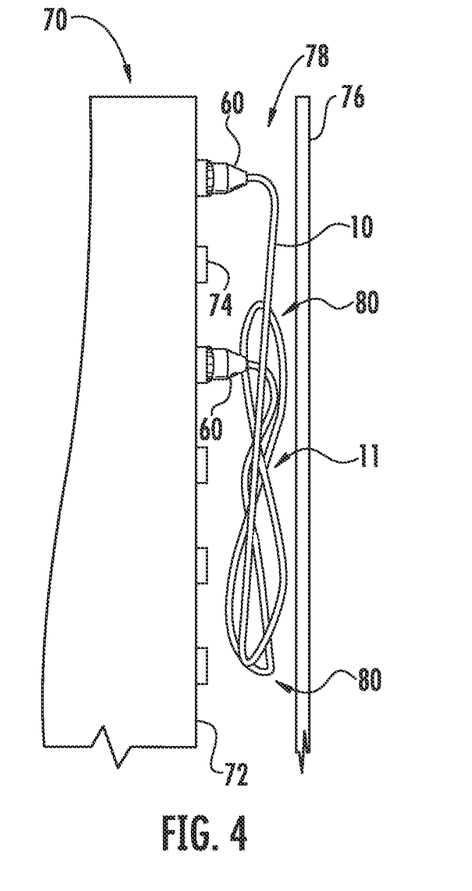
FIG. 4 is a schematic fragmentary side view of the jumper connecting two ports of a telecommunications device while being tightly coiled in a narrow space.

FIG. 4 is a schematic fragmentary side view of jumper 11 used to form a cross-connection within a telecommunications device 70. Telecommunication device 70 has a surface 72 with connection ports 74 configured to mate with connectors 60. Telecommunications device 70 also includes a front door 76 that defines a narrow space 78 between the front door and device front surface 72. Jumper 11 is shown cross-connecting two ports 72 within narrow space 78. Because jumper 11 includes BR-MM fiber 20, it can be tightly coiled to fit into the narrow space 78 since severe bends 80 associated with the coil do not substantially impact the performance of the jumper. This allows for narrow space 78 to be smaller than is possible with prior art jumpers, thereby allowing for a smaller telecommunications device 70.

Another benefit of using a BR-MM fiber 20 is that it is less susceptible to shrinkage of cable jacket 50 effects due to relaxation of residual extrusion stress therein and also due to expansion and contraction attendant with temperature variations. These effects can produce substantial bends in cable 10 that do not impact BR-MM fiber 20 as adversely as they would non-bend-resistant optical fiber.

Bend-Insensitive Multimode Fibers

Figure 5:
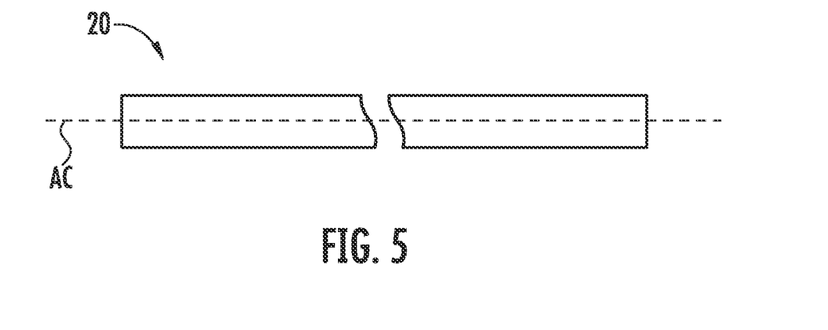
FIG. 5 is a side view of an example bend-resistant multimode optical fiber used in example embodiments of the fiber optic jumper cable disclosed herein.
Figure 6:
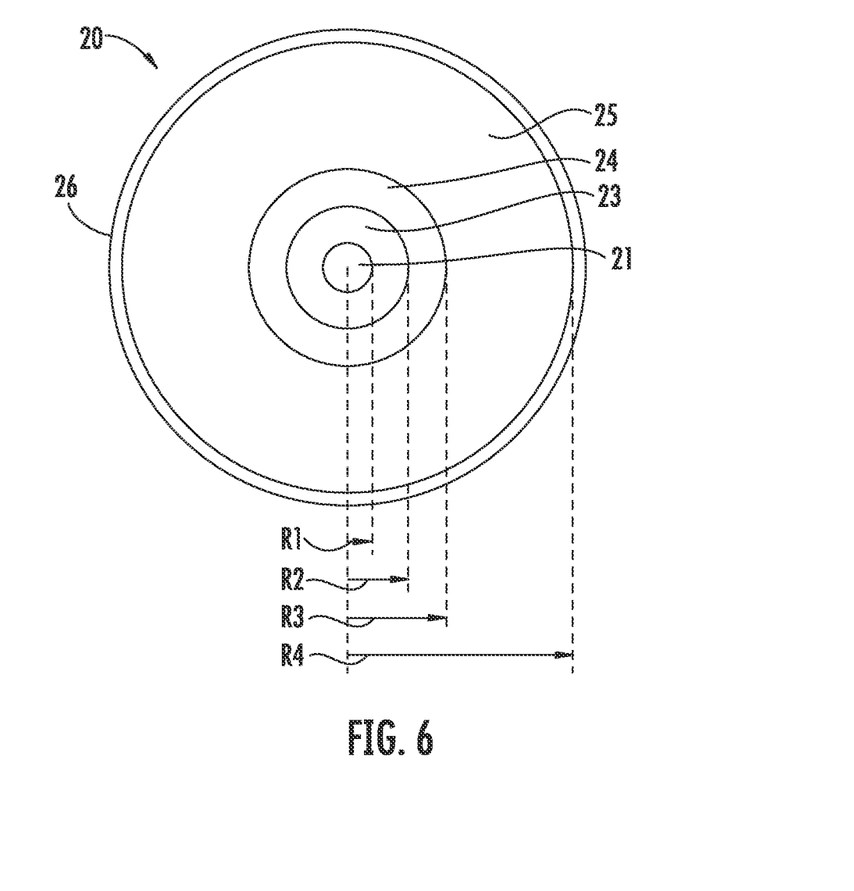
FIG. 6 is a schematic representation (not to scale) of a cross-sectional view of the bend-resistant multimode fiber of FIG. 5.
Figure 7:
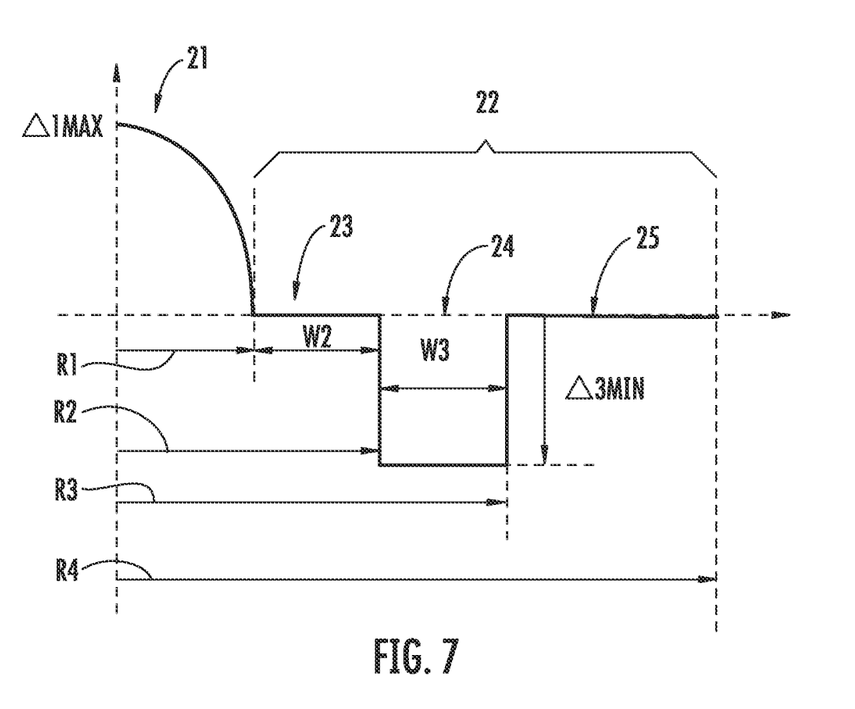
FIG. 7 shows an example schematic representation (not to scale) of the refractive index profile for the cross-section of FIG. 6, wherein the depressed-index annular portion is offset from the core by an inner annular portion and is surrounded by an outer annular portion.

As discussed above, cable 10 includes a BR-MM fiber 20. FIG. 5 is a side view of an example BR-MM fiber 20, which has a central axis or "centerline" AC. FIG. 6 is an example cross-sectional view of BR-MM fiber 20 of FIG. 5. FIG. 7 shows a schematic representation of the refractive index profile BR-MM fiber 20. BR-MM fiber 20 has a glass core 21 and a glass cladding 22, the cladding comprising an inner annular portion 23, a depressed-index annular portion 24, and an outer annular portion 25. Core 21 has outer radius R1 and maximum refractive index delta $\Delta 1MAX$. The inner annular portion 23 has width W2 and outer radius R2. Depressed-index annular portion 24 has minimum refractive index delta percent $\Delta 3MIN$, width W3 and outer radius R3. The depressed-index annular portion 24 is shown offset, or spaced away, from the core 21 by the inner annular portion 23. Annular portion 24 surrounds and contacts the inner annular portion 23. The outer annular portion 25 surrounds and contacts the annular portion 24. The clad layer 22 is surrounded by at least one coating 26, which may in some embodiments comprise a low modulus primary coating and a high modulus secondary coating. An example BR-MM fiber 20 is the CLEARCURVE multimode fiber, available from Corning, Inc., Corning, N.Y.

An example inner annular portion 23 has a refractive index profile $\Delta 2(r)$ with a maximum relative refractive index $\Delta 2MAX$, and a minimum relative refractive index $\Delta 2MIN$, where in some embodiments $\Delta 2MAX=\Delta 2MIN$. An example depressed-index annular portion 24 has a refractive index profile $\Delta 3(r)$ with a minimum relative refractive index $\Delta 3MIN$. An example outer annular portion 25 has a refractive index profile $\Delta 4(r)$ with a maximum relative refractive index $\Delta 4MAX$, and a minimum relative refractive index $\Delta 4MIN$, where in some embodiments $\Delta 4MAX=\Delta 4MIN$. Preferably, $\Delta 1MAX > \Delta 2MAX > \Delta 3MIN$. In some embodiments, the inner annular portion 23 has a substantially constant refractive index profile, as shown in FIG. 7 with a constant $\Delta 2(r)$; in some of these embodiments, $\Delta 2(r)=0\%$.

In some embodiments, the outer annular portion 25 has a substantially constant refractive index profile, as shown in FIG. 7 with a constant $\Delta 4(r)$; in some of these embodiments, $\Delta 4(r)=0\%$. The core 21 has an entirely positive refractive index profile, where $\Delta 1(r)>0\%$. Radius R1 is defined as the radius at which the refractive index delta of the core first reaches value of 0.05%, going radially outwardly from the centerline AC. Preferably, the core 21 contains substantially no fluorine, and more preferably the core 21 contains no fluorine. In some embodiments, the inner annular portion 23 preferably has a relative refractive index profile $\Delta 2(r)$ having a maximum absolute magnitude less than 0.05%, and $\Delta 2MAX<0.05\%$ and $\Delta 2MIN>-0.05\%$, and the depressed-index annular portion 24 begins where the relative refractive index of the cladding first reaches a value of less than −0.05%, going radially outwardly from the centerline. In some embodiments, the outer annular portion 25 has a relative refractive index profile $\Delta 4(r)$ having a maximum absolute magnitude less than 0.05%, and $\Delta 4MAX<0.05\%$ and $\Delta 4MIN>-0.05\%$, and the depressed-index annular portion 24 ends where the relative refractive index of the cladding first reaches a value of greater than −0.05%, going radially outwardly from the radius where $\Delta 3MIN$ is found.

BR-MM fiber 20 may comprise a graded-index core 21 with cladding 22 surrounding and directly adjacent the core, with the cladding comprising depressed-index annular portion 24 having a depressed relative refractive index relative to another portion of the cladding. The depressed-index annular portion 24 of cladding 22 is preferably spaced apart from core 21. Preferably, the refractive index profile of the core 21 has a parabolic or substantially curved shape. The depressed-index annular portion 24 may, for example, comprise: a) glass comprising a plurality of voids, or b) glass doped with one or more downdopants such as fluorine, boron, individually or mixtures thereof. The depressed-index annular portion 24 may have a refractive index delta less than about −0.2% and a width of at least about 1 micron, with the depressed-index annular portion being spaced from the core 21 by at least about 0.5 microns.

In some embodiments, BR-MM fiber 20 comprises a cladding with voids, the voids in some preferred embodiments are non-periodically located within the depressed-index annular portion. "Non-periodically located" means that if takes a cross section (such as a cross section perpendicular to the longitudinal axis) of BR-MM 20, the non-periodically disposed voids are randomly or non-periodically distributed across a portion of the fiber (e.g. within the depressed-index annular region). Similar cross sections taken at different points along the length of the BR-MM fiber 20 will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

BR-MM fiber 20 exhibits very low bend-induced attenuation, and in particular very low macrobending induced attenuation. In some embodiments, high bandwidth is provided by low maximum relative refractive index in the core, and low bend losses are also provided. Consequently, BR-MM fiber 20 fiber may comprise a graded index glass core 21; and an inner cladding 23 surrounding and in contact with the core, and a second cladding 24 comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture (NA) of greater than 0.14, more preferably greater than 0.17, even more preferably greater than 0.18, and most preferably greater than 0.185, and an overfilled bandwidth greater than 1.5 GHz-km at 850 nm. By way of example, the numerical aperture for BR-MM fiber 20 is between about 0.185 and about 0.215.

In an example embodiment, core 21 has a 50 micron diameter (nominal). Such BR-MM fibers 20 can be made to provide an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. By way of example, these high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB.

Such BR-MM fibers 20 are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, BR-MM fiber 20 exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, BR-MM fiber 20 exhibits a spectral attenuation of less than 1.0 dB/km at 1300 nm, preferably less than 0.8 dB/km at 1300 nm, even more preferably less than 0.6 dB/km at 1300 nm.

In some embodiments, the core 21 extends radially outwardly from the centerline AC to a radius R1, wherein $10$ microns$\leq$R1$\leq$40 microns, more preferably 20 microns$\leq$R1$\leq$40 microns. In some embodiments, 22 microns$\leq$R1$\leq$34 microns. In some preferred embodiments, the outer radius of the core 21 is between about 22 to 28 microns. In some other preferred embodiments, the outer radius of the core is between about 28 to 34 microns.

In some embodiments, the core 21 has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, BR-MM fiber 20 exhibits a 1-turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm. Example BR-MM fibers 20 are also disclosed in U.S. patent application Ser. Nos. 12/250,987 filed on Oct. 14, 2008, and 12/333,833 filed on Dec. 12, 2008, the disclosures of which are incorporated herein by reference.

Figure 8:
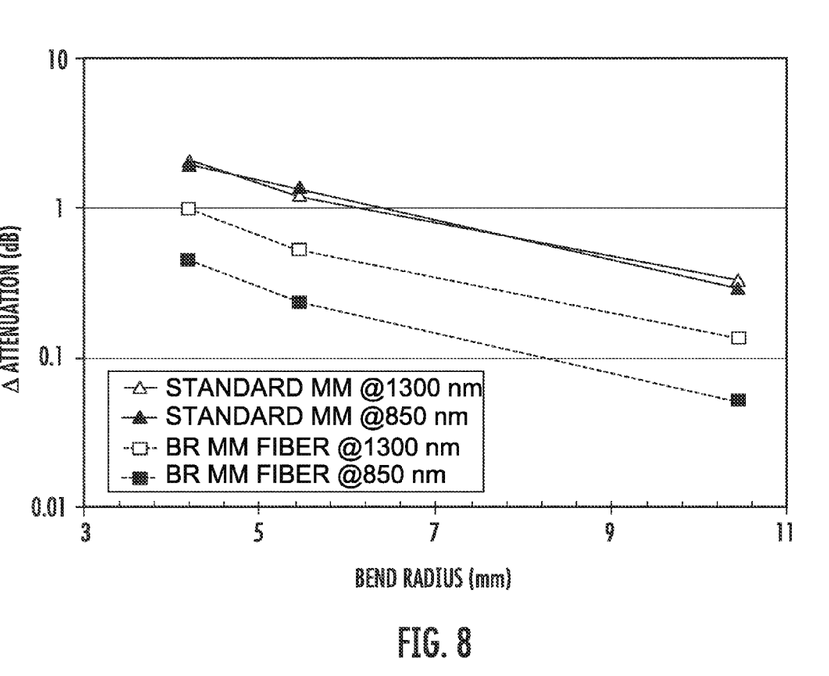
FIG. 8 is a plot of the change in attenuation ("Δ attenuation") in dB versus bend radius in mm for a standard 50 micron multimode fiber and a 50 micron bend-resistant multimode fiber at wavelengths of 850 nm and 1,300 nm.

FIG. 8 is a plot of the change in attenuation ("Δ attenuation") in dB versus bend radius in mm for standard 50 micron multimode fiber and a 50 micron BR-MM fiber 20 at wavelengths of 850 nm and 1,300 nm. The bend radius was established using two wraps around mandrels having radii of 4.2 mm, 5.4 mm and 10.4 mm. A bend test around a 120 mm diameter mandrel as used to model projected attenuation for both the standard multimode fiber and BR-MM fiber 20. The data indicate that the BR-MM fiber 20 provides about a 4× attenuation benefit at 850 nm and about a 2× benefit at 1,300 nm over standard multimode optical fiber.

Figure 9:
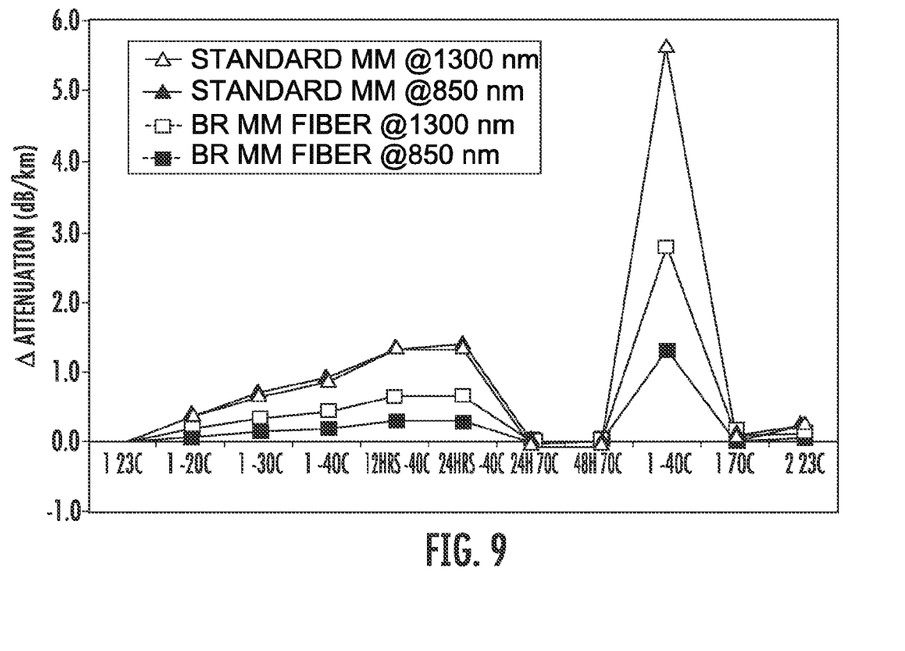
FIG. 9 is a plot of the modeled Δ attenuation in dB versus time/temperature at wavelengths of 850 nm and 1,300 nm for a fiber optic jumper cable having standard multimode fiber and for an example fiber optic jumper cable of the present disclosure.

Using the bend-loss information from FIG. 8, the projected performance for cable 10 when exposed to temperature cycling was modeled BR-MM fiber 20. The model compared bending effects from the model results shown in FIG. 8 to actual test data for a standard cable with 50 micron multimode fiber that was tested for a potential application as a security camera cable. FIG. 9 is a plot of "Δ attenuation" in dB versus time/temperature for a $D_O$=3 mm polyethylene cable with standard 50 micron (core diameter) multimode optical fiber and the same cable but with a 50 micron BR-MM fiber 20.

The reduction in cable attenuation seen for MM-BR fiber 20 meets industry standards ICEA-596 and GR-409 for multimode fiber of $\leq$0.6 dB/km at a temperature of −40° C. for outside plant cables. These attenuation requirements are utilized when designing optical telecommunication systems to ensure that loss budgets are achieved.

Additional performance gains can be obtained by optimizing the jacketing process through fiber-strain control and tolling draw optimization to control shrinkage.

Figure 10:
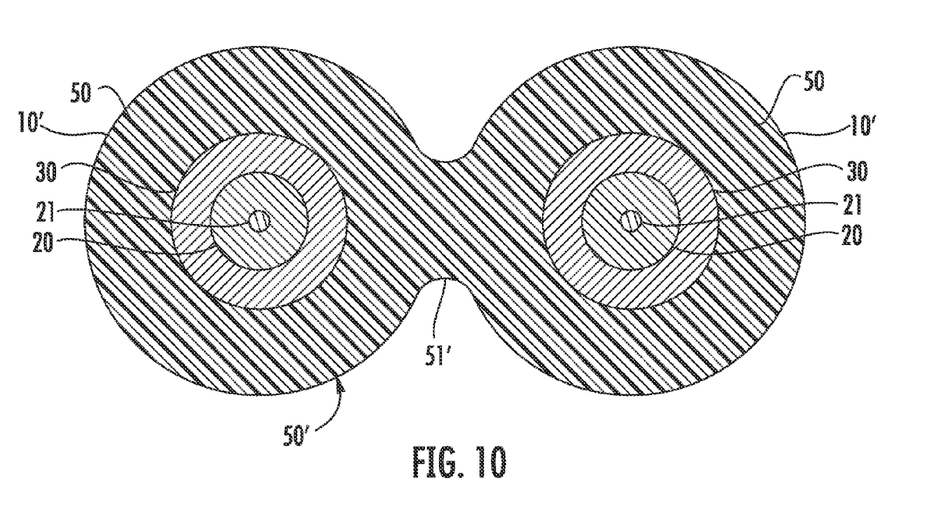
FIG. 10 is a cross-sectional view similar to FIG. 2, and shows an example "zipcord" type fiber optic jumper cable that utilizes two side-by-side cables with a common protective cover.

Additionally, the performance of cables 10 is such that they can be utilized for longer distances. One such example application is as a security camera cable. A typical security camera installation may use a duplex jumper also known as a "zipcord." FIG. 10 is a cross-sectional view similar to FIG. 2, except it shows an example zipcord duplex-type fiber optic jumper cable 10' made up of two cables 10 having common outer jacket 50'. Common outer jacket 50' is formed by two outer jackets 50' joined via a connecting portion 51'. Common outer jacket 50' is typically simultaneously extruded over the two cable 10 so that it includes connecting portion 51'.

It will be apparent to those skilled in the art that various modifications and variations can be made to the present disclosure without departing from the spirit and scope of the disclosure. Thus, it is intended that the present disclosure cover the modifications and variations of this disclosure, provided they come within the scope of the appended claims and their equivalents.

I claim:

1. A fiber optic jumper cable having a central axis, comprising:
    a bend-resistant multimode optical fiber generally arranged along the central axis, wherein the bend resistance of the multimode optical fiber is such that:
        with one turn around a 10 mm diameter mandrel, the bend-resistant multimode optical fiber exhibits an attenuation increase of less than 0.5 dB at a wavelength of 850 nm;
        with one turn around a 15 mm diameter mandrel, the bend-resistant multimode optical fiber exhibits an attenuation increase of less than 0.2 dB at a wavelength of 850 nm; and
        with one turn around a 20 mm diameter mandrel, the bend-resistant multimode optical fiber exhibits an attenuation increase of less than 0.1 dB at a wavelength of 850 nm;
    a tensile-strength layer surrounding the bend-resistant optical fiber; and
    a protective cover surrounding the tensile-strength layer and having an outside diameter DO in the range 1.6 mm$\leq$DO$\leq$4 mm, wherein the protective cover is a protective outer layer in the form of a cable jacket, wherein the protective cover comprises polyethylene, and wherein the protective cover is formed from at least 80% polyethylene.

2. The fiber optic jumper cable of claim 1, wherein the tensile-strength layer comprises at least one of aramid yarn, fiberglass and super-absorbent polymer.

3. The fiber optic jumper cable of claim 1, wherein the protective cover has a thickness T50 in the range 0.15 mm$\leq$T50$\leq$0.55 mm.

4. A zipcord-type fiber optic jumper cable, comprising:
two fiber optic jumper cables according to claim 1 arranged side-by-side and that share a common protective cover having a connecting portion.

5. The fiber optic jumper cable of claim 1, wherein the cable jacket is formed from flame retardant polyethylene.

6. The fiber optic jumper cable of claim 1, wherein the cable has an outside diameter in the range of 1.6 mm to 4 mm.

7. The fiber optic jumper cable of claim 1, wherein the cable does not include anti-buckling elements and wherein the tensile strength layer provides protection from tensioning forces but does not provide substantial anti-buckling strength or anti-bending strength.

8. The fiber optic jumper cable of claim 1, wherein the bend resistance of the multimode optical fiber is such that:
- with one turn around a 10 mm diameter mandrel, the bend-resistant multimode optical fiber exhibits an attenuation increase of less than 0.3 dB at a wavelength of 850 nm;
- with one turn around a 15 mm diameter mandrel, the bend-resistant multimode optical fiber exhibits an attenuation increase of less than 0.1 dB at a wavelength of 850 nm; and
- with one turn around a 20 mm diameter mandrel, the bend-resistant multimode optical fiber exhibits an attenuation increase of less than 0.05 dB at a wavelength of 850 nm.

* * * * *